No. 797,665. PATENTED AUG. 22, 1905.
F. P. CROFT.
MILL FOR PREPARING COCOA, &c.
APPLICATION FILED APR. 7, 1902.
3 SHEETS—SHEET 3.
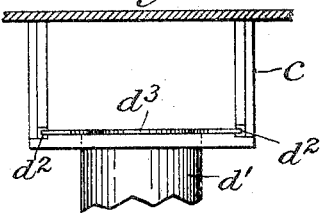
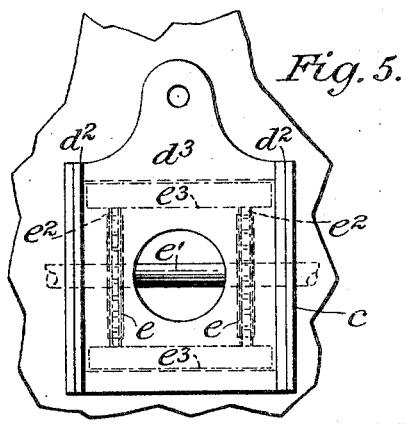
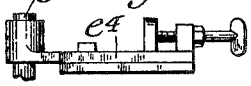
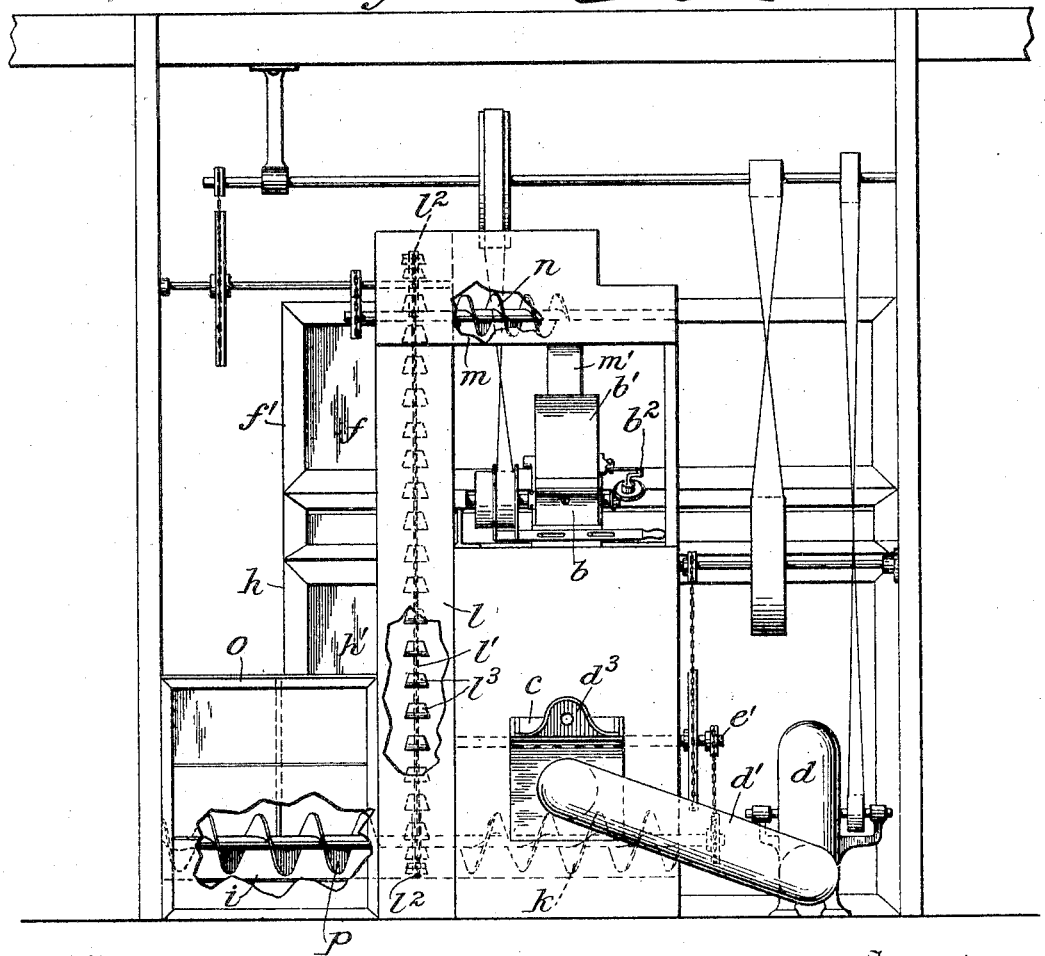

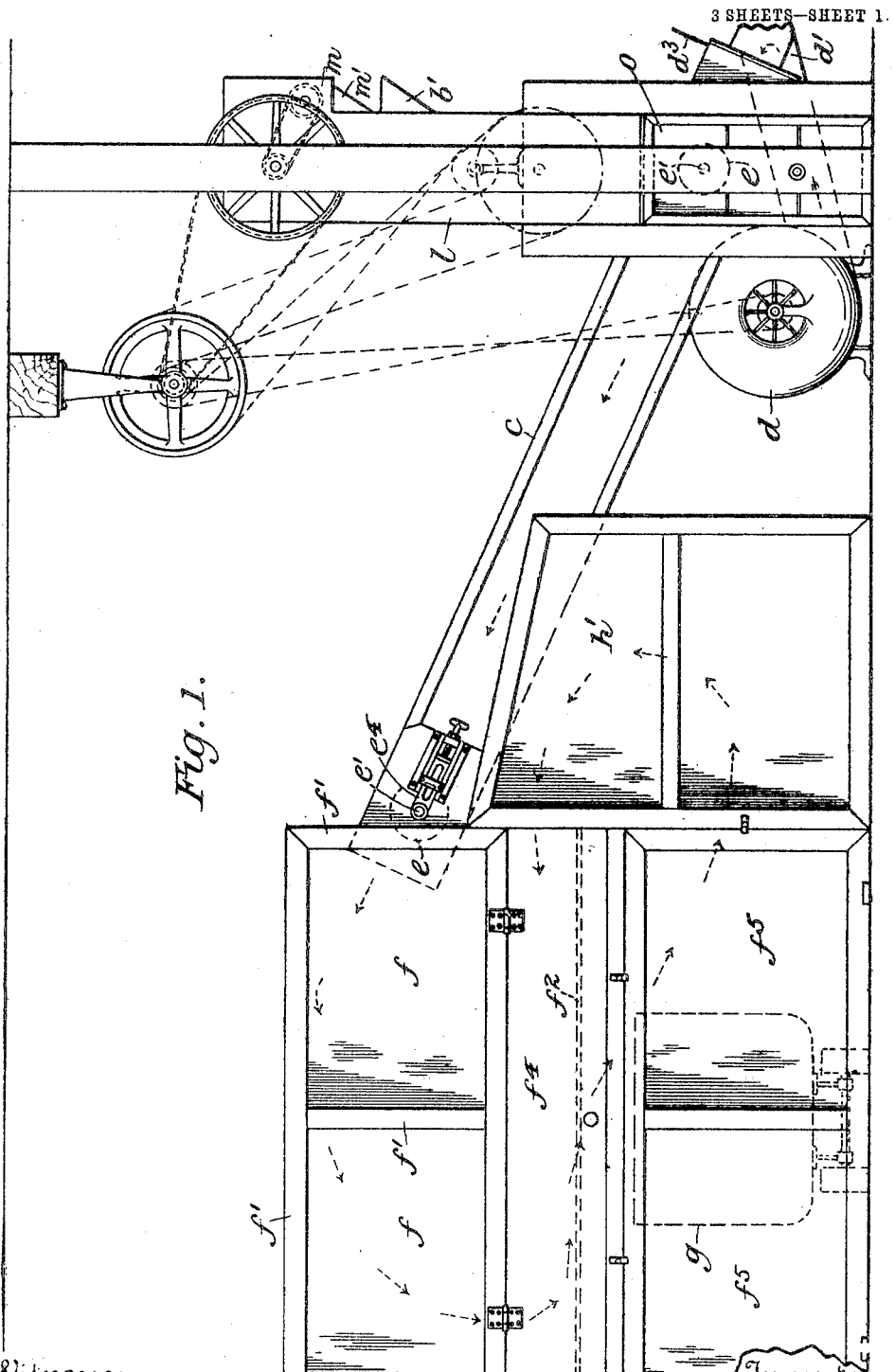

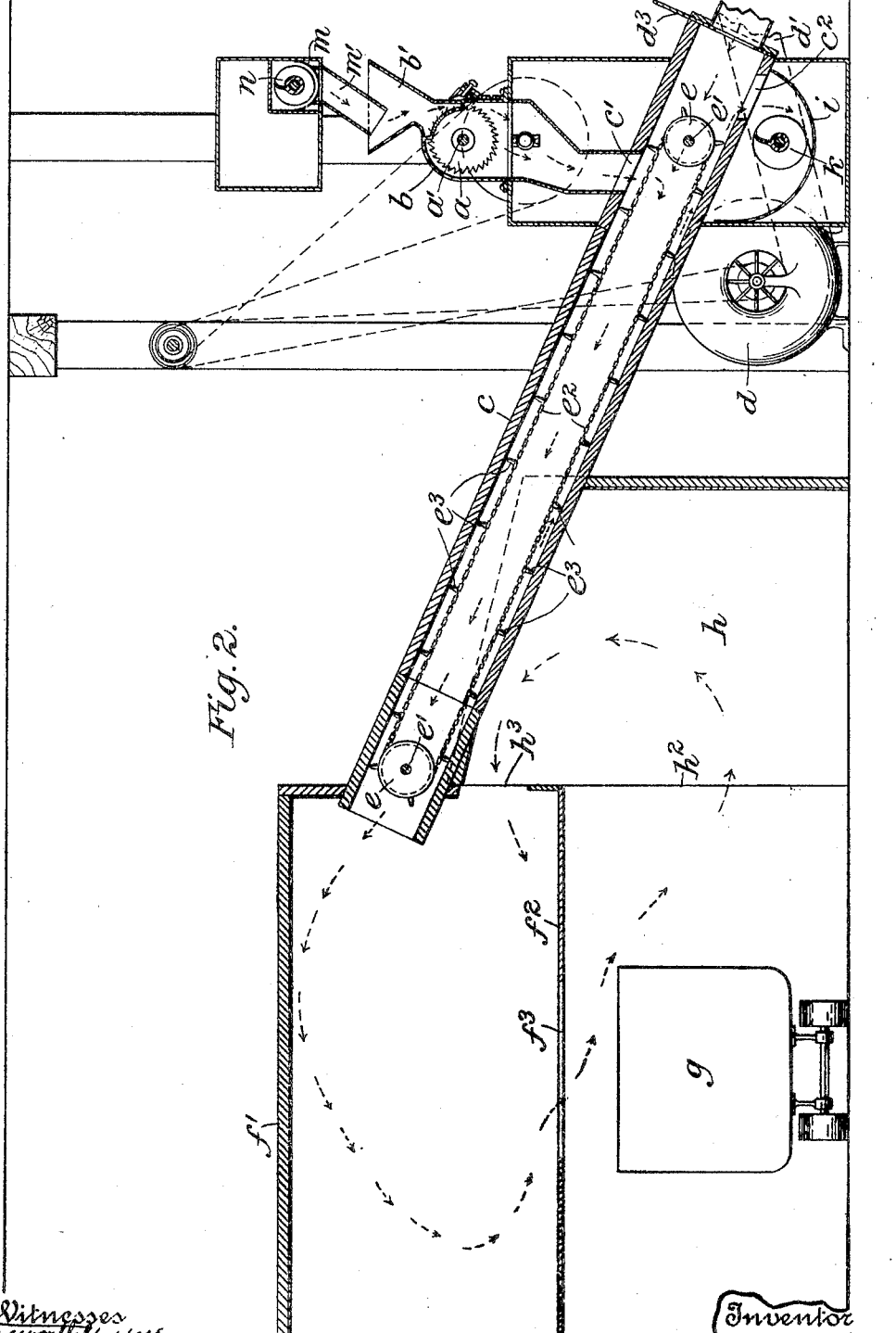

UNITED STATES PATENT OFFICE.

FRANK P. CROFT, OF MERION, PENNSYLVANIA.

MILL FOR PREPARING COCOA, &c.

No. 797,665.    Specification of Letters Patent.    Patented Aug. 22, 1905.

Application filed April 7, 1902. Serial No. 101,642.

*To all whom it may concern:*

Be it known that I, FRANK P. CROFT, a citizen of the United States, residing in Merion, county of Montgomery, State of Pennsylvania, have invented certain new and useful Improvements in Mills for Preparing Cocoa, &c., of which the following is a specification, reference being had to the accompanying drawings, forming a part hereof.

In the preparation of cocoa for the market as heretofore carried on much difficulty has been experienced in the reduction of the cocoa to the desired degree of fineness. Usually after grinding the cocoa has been passed through sieves in order to separate that portion which has been reduced to the desired fineness from that portion which must be reground; but the sifting of the cocoa in this manner is necessarily slow, the sieves quickly choke up with particles of cocoa, and the cocoa itself suffers undesirable changes in color, which sometimes affect its market value.

It is the object of this invention to provide for the rapid reduction of cocoa to the desired degree of fineness without passing it through sieves and without permitting it to heat or otherwise to suffer any change in quality or color during reduction.

In the improved mill or apparatus the cocoa, immediately after being ground, is subjected to the action of a blast of air which serves to separate that portion which is sufficiently fine from that portion which requires further grinding, cools the particles of cocoa as they come from the grinder, preventing any change in color or quality, and distributes the finely-ground cocoa so that no heating can occur.

It will be obvious that the invention is applicable to other particular uses than the preparation of cocoa, and although the primary object of the invention is to improve the preparation of cocoa nevertheless it will be understood that the invention is not necessarily restricted to the treatment of this particular substance.

The invention will be more fully described hereinafter with reference to the accompanying drawings, in which for purposes of illustration and explanation the apparatus is shown in a convenient and practical form, which has been found to operate satisfactorily.

In the drawings, Figure 1 is a view in side elevation of the apparatus. Fig. 2 is a longitudinal section on an irregular vertical plane. Fig. 3 is an end elevation of the apparatus as seen from the right in Fig. 1. Figs. 4 and 5 are detail views, on a larger scale, illustrating particularly the means for regulating the blast of air. Fig. 6 is a detail view, also on a larger scale, of the device for adjusting the tension of the conveyer.

The apparatus shown in the drawings is so designed that the freshly-ground cocoa shall be struck by a blast of air which carries it forward into a suitable settling or collecting chamber that which is sufficiently fine, while the remaining portion is returned to be reground.

The apparatus comprises a suitable grinder, means for directing a blast of air upon the freshly-ground material, a settling or collecting chamber, and suitable conveyers for handling the material. It will be obvious that these parts may be variously arranged and that, if so desired, the grinding might be effected by a separate machine; but for convenience and rapid action the several parts are preferably combined in one apparatus.

Any suitable grinder may be employed, that represented in the drawings being well adapted for the purpose. It comprises a series of circular saws, one of which is represented at $a$, mounted upon a common shaft $a'$, the gang of saws being inclosed in a suitable casing $b$, provided with a feeding-hopper $b'$, the hopper being reciprocated by any suitable means, as by a crank $b^2$. From the grinder the cocoa or other material falls into a chute $c$, the opening $c'$ being preferably at a short distance from the end of the chute, which is itself preferably inclined upward, substantially as represented. Provision is made for the introduction of a blast of air at the lower end of the chute, the means shown consisting of a blower $d$, connected by a suitable pipe $d'$ with the lower end of the chute, which is provided with ways $d^2$ for the reception of a diaphragm $d^3$. Several such diaphragms having openings of different sizes are provided, so that the blast of air may be regulated according to the results to be produced. Within the chute $c$ is provided a conveyer, which may consist of suitable sprocket-wheels $e$, mounted upon shafts $e'$, one of which, preferably the lower one, is the driver, endless chains $e^2$, and blades $e^3$ carried thereby. The upper shaft $e'$ is preferably carried by an adjustable bearing $e^4$, as shown in Figs. 1 and 6, so that the tension of the chains may be adjusted. The conveyer is driven in such a direction that the blades $e^3$, which are in contact with the lower side of the chute $c$, shall travel downward or in a direction opposite to that of the blast of air for the purpose of carrying backward through the chute the larger particles of cocoa which are deposited on the bottom of the chute and should be ground finer before being discharged into the receiving or collecting chamber, into which those particles which are sufficiently fine are carried by the blast of air. It will be obvious that by regulating the blast of air only those particles which have the desired fineness will be carried through the chute, all other particles being retained by the conveyer.

The receiving, settling, or collecting chamber, into which the fine material is discharged from the chute by the blast of air, is suitably constructed for the collection of the material and for the release of the air without loss of the material. For this purpose the walls of the chamber are made of muslin, (indicated at $f$,) through which the air may escape while the fine material is retained, the muslin being supported by a suitable framework, (indicated at $f'$.) The chamber is preferably provided with a horizontal partition $f^2$, in which is formed a substantially central opening $f^3$. The greater part of the fine material settles upon the intermediate floor or partition $f^2$, upon which it is evenly distributed, so that there is no liability of heating in any one part, with a consequent change in color or quality of a portion of the material. Below the opening $f^3$ may be placed a tank $g$, in which some of the material is deposited by the blast of air and into which so much of the material as collects upon the intermediate floor or partition $f^2$ may be gathered when the operation of the apparatus is temporarily discontinued. A door $f^4$ is provided to give access to the upper part of the chamber and another door $f^5$ to give access to the lower part of the chamber and to permit the tank $g$ to be introduced and withdrawn. In some cases or under some conditions it is found that more or less back pressure is developed if the chamber is constructed as already described and that the material does not settle uniformly upon all parts of the floor. To obviate these difficulties, an auxiliary chamber $h$ is provided, the same being constructed in substantially the same manner as the main chamber with walls $h'$ of muslin supported by a suitable framework. This auxiliary chamber communicates, through an opening at $h^2$, with the lower part of the main chamber and also through an opening at $h^3$ with the upper part of the main chamber, so that the current of air within the chambers follows the general line indicated by the arrows in Figs. 1 and 2. With this arrangement it is found that practically no back pressure is developed and that the material is deposited uniformly without excessive accumulations at any one point.

The heavier material, which is returned through the chute $c$, is discharged therefrom through an opening $c^2$ in the lower side thereof and nearer the lower end of the chute than the opening $c'$. The coarser material which must be reground falls through the opening $c^2$ into a receiver $i$, from which it is conveyed, preferably, by a screw conveyer $k$ into the pit of an elevator-shaft $l$, in which is disposed a vertical conveyer which may consist of an endless chain $l'$, carried by suitable sprocket-wheels $l^2$ and provided with suitable buckets $l^3$. The elevator discharges the material into a receiver $m$, in which may be disposed a screw conveyer $n$ to transfer the material to a chute $m'$, by which it is discharged into the hopper $b'$ of the grinder. By locating the openings $c'$ and $c^2$ substantially as shown in Fig. 2 the proper action of the blast of air upon the freshly-ground material is secured without creating undue back pressure in any part of the mechanism.

It is sometimes the case that the material to be treated is brought to the apparatus so finely broken up as to make it inconvenient to place the same in the hopper $b'$ of the grinder. Accordingly a receptacle $o$ is provided for material in such condition, and in the bottom thereof may be disposed a screw conveyer $p$, by which the material is transferred to the pit of the elevator-shaft, to be thence conveyed by the elevator and the conveyer $n$ to the hopper $b'$.

The mode of operation of the apparatus and the method of treating the cocoa or other material will now be readily understood. Having been ground or otherwise broken up, the material is struck by the blast of air which may be regulated in temperature according to the prevailing conditions as well as in intensity or volume, and the material is immediately brought to the proper temperature, whether the same be higher or lower, and is carried upward through the chute, the coarser particles being deposited on the way to be returned for further grinding or breaking up, while the particles sufficiently fine are discharged into the receiving-chamber and are then distributed uniformly, so that there shall be no excessive accumulations at any point, and consequently no heating of the material. When the material has accumulated in the receiving-chamber in the desired quantity, the operation is discontinued and the material is either collected at once or allowed to remain spread out on the floor of the receiving-chamber until it can be safely gathered in the tank without danger of heating. It will be found that by this method of treatment and with such an apparatus as that described the fine cocoa or other material will be uniform in color and quality and will have suffered no injurious change.

It will be obvious that the apparatus for conveniently and advantageously treating the material may be varied in the construction and arrangement of its several parts without departing from the spirit of the invention.

I claim as my invention—

1. An apparatus for treating cocoa or other material comprising an inclined chute, means for delivering the ground or broken-up material into the chute, near its lower end, means for supplying a blast of air against the material as it is delivered to the chute to carry the finer particles forward in the chute, a receiving-chamber arranged to receive the particles carried by the air-blast and to permit the air to escape, and a positively-acting conveyer within the chute arranged to move the heavier particles along the chute in a direction contrary to the direction of the air-blast; substantially as described.

2. An apparatus for treating cocoa or other material comprising an inclined chute, means for delivering ground or broken-up material into the chute near its lower end, means for supplying a blast of air against the material as it is delivered to the chute to carry the finer particles forward in the chute, a receiving-chamber arranged to receive the particles carried by the air-blast and to permit the air to escape, and a conveyer comprising an endless chain carrying blades, located within the chute and arranged to positively act upon the heavier particles to move them along the chute in a direction contrary to the direction of the air-blast; substantially as described.

3. An apparatus for treating cocoa or other material comprising an inclined chute, means for delivering ground or broken-up material into the chute, means for supplying a blast of air against the material as it is delivered to the chute to carry the finer particles forward in the chute, a receiving-chamber arranged to receive the particles carried by the air-blast and to permit the air to escape, and a conveyer located within the chute comprising an endless chain carrying blades arranged to contact with the lower side of the chute and positively act upon the heavier particles to move them along the chute in a direction contrary to the direction of the air-blast; substantially as described.

4. An apparatus for treating cocoa or other material comprising a grinder, a chute into which the freshly-ground material is discharged from the grinder, means for discharging a blast of air against the freshly-ground material to carry the material forward in the chute, the chute being of such length that the coarser particles of the ground material will be deposited therein, means for removing the coarser particles from the chute and returning them to the grinder, and a receiving-chamber into which the finer particles of the ground material are carried by the blast of air and from which the air may escape; substantially as described.

5. An apparatus for treating cocoa or other material comprising a grinder, a chute into which the freshly-ground material is discharged from the grinder, means for discharging a blast of air against the freshly-ground material to carry the material forward in the chute, the chute being of such length that the coarser particles of the ground material will be deposited therein, a traveling conveyer in said chute arranged to move the coarser particles deposited in the chute in a direction contrary to the direction of the blast of air, means for conveying the coarser particles to the grinder and the receiving-chamber into which the finer particles are carried by the blast of air, and from which the air may escape; substantially as described.

6. An apparatus for treating cocoa and other material comprising a grinder, an inclined chute into which the freshly-ground material is discharged from the grinder, means for discharging a blast of air against the freshly-ground material to carry the material forward in the chute, the chute being of such length that the coarser particles of the ground material will be deposited therein, a traveling conveyer in the chute arranged to move the coarser particles deposited in the chute in a direction opposite to the direction of the blast of air, an elevator and conveyer for returning the coarser particles to the grinder, and a receiving-chamber into which the finer particles of the ground material are carried by the blast of air and from which the air may escape; substantially as described.

7. An apparatus for treating cocoa or other material comprising a grinder, a chute having an opening through which the material from the grinder is discharged, means to discharge a blast of air against the freshly-ground material to carry the material forward in the chute, a receiving-chamber into which the finer particles are carried by the blast of air and from which the air may escape, the chute having in its under side, near the entrance of the air-blast, an opening for discharging the coarser particles, positive means for moving the coarser particles along said chute in a direction opposite to the direction of the blast of air toward said second opening and means to return such coarser particles from said second opening to the grinder; substantially as described.

8. An apparatus for treating cocoa or other material comprising a chute, means for delivering ground or broken-up material to the chute, means for discharging a blast of air against such material, and a receiving-chamber into which the finer particles are carried by the blast of air and from which the air may escape, said chamber having an intermediate floor or horizontal partition below the level at which the blast of air enters the chamber, to receive such finer particles, such floor or horizontal partition being formed with an opening through which the air may pass freely; substantially as described.

9. An apparatus for treating cocoa or other material comprising a chute, means for delivering the ground or broken-up material to the chute, means for discharging a blast of air against such material, a receiving-chamber into which the finer particles are carried by the blast of air, and from which the air may escape, said chamber having an intermediate floor or horizontal partition below the level at which the blast of air enters the chamber, to receive such finer particles, such floor or horizontal partition being formed with an opening through which the air may pass freely, and an auxiliary chamber communicating with the upper and lower portions of the first-named chamber; substantially as described.

This specification signed and witnessed this 2d day of April, A. D. 1902.

FRANK P. CROFT.

In presence of—
   EDWIN F. ROBERTS,
   R. S. REED.